United States Patent
Vaubourg

(10) Patent No.: US 9,610,641 B2
(45) Date of Patent: Apr. 4, 2017

(54) MONOFILAMENT METAL SAW WIRE

(75) Inventor: Jean-Pierre Vaubourg, Hettange-Grande (FR)

(73) Assignees: ARCELORMITTAL BISSEN & BETTEMBOURG, Bissen (LU); APPLIED MATERIALS SWITZERLAND SARL, Cheseaux sur Lausanne (CH)

( * ) Notice: Subject to any disclaimer, the term of this patent is extended or adjusted under 35 U.S.C. 154(b) by 691 days.

(21) Appl. No.: 11/722,157

(22) PCT Filed: Dec. 12, 2005

(86) PCT No.: PCT/EP2005/056684
§ 371 (c)(1),
(2), (4) Date: Jun. 19, 2007

(87) PCT Pub. No.: WO2006/067062
PCT Pub. Date: Jun. 29, 2006

(65) Prior Publication Data
US 2009/0090344 A1    Apr. 9, 2009

(51) Int. Cl.
*B23D 61/18* (2006.01)
*B28D 1/08* (2006.01)
*B23D 57/00* (2006.01)
*B28D 5/04* (2006.01)

(52) U.S. Cl.
CPC ......... *B23D 61/185* (2013.01); *B23D 57/003* (2013.01); *B23D 57/0007* (2013.01); *B23D 61/18* (2013.01); *B28D 1/08* (2013.01); *B28D 5/045* (2013.01)

(58) Field of Classification Search
CPC ...... B28D 1/08; B28D 5/045; B23D 57/0007; B23D 57/003; B23D 61/18; B23D 61/185
USPC .................... 125/16.01, 16.02, 21
See application file for complete search history.

(56) References Cited

U.S. PATENT DOCUMENTS

| 2,274,699 | A |   | 3/1942  | Jacobs |
| 2,451,383 | A |   | 10/1948 | D'Avaucourt |
| 2,860,862 | A |   | 11/1958 | Horton |
| 3,565,129 | A | * | 2/1971  | Field ............................ 140/105 |
| 3,763,683 | A | * | 10/1973 | Alderfer ......................... 72/77 |
| 4,117,873 | A | * | 10/1978 | Crawford ..................... 140/105 |
| 4,790,129 | A | * | 12/1988 | Hutchins ....................... 57/204 |

(Continued)

FOREIGN PATENT DOCUMENTS

| FR | 750 081 | 8/1933 |
| JP | Heil-143345 | 10/1989 |

(Continued)

OTHER PUBLICATIONS

International Search Report; PCT/EP2005/056684; Jan. 26, 2006.

(Continued)

*Primary Examiner* — Eileen Morgan
(74) *Attorney, Agent, or Firm* — Cantor Colburn LLP

(57) ABSTRACT

Monofilament metal saw wire for a wire saw, wherein the saw wire being provided with a plurality of crimps. The crimps are arranged in at least two different planes, such that, when measured, between measuring rods of a micrometer, over a length comprising crimps in at least two different planes, a circumscribed enveloping D diameter of the saw wire is between 1.05 and 1.50 times a diameter d of the saw wire itself.

15 Claims, 3 Drawing Sheets

(56) References Cited

U.S. PATENT DOCUMENTS

| | | | |
|---|---|---|---|
| 5,261,974 A | 11/1993 | Hyodo et al. | |
| 6,273,161 B1* | 8/2001 | Yamagami et al. | 152/527 |
| 7,063,116 B2* | 6/2006 | Miyazaki et al. | 152/527 |
| 7,434,381 B2* | 10/2008 | Vaubourg et al. | 57/311 |
| 2007/0082561 A1* | 4/2007 | Vaubourg et al. | 439/894 |

FOREIGN PATENT DOCUMENTS

| | | |
|---|---|---|
| JP | 1289527 | 11/1989 |
| JP | 04 057666 | 2/1992 |
| JP | 2004276207 | 10/2004 |
| WO | 90/12670 | 11/1990 |
| WO | 9928457 | 6/1999 |

OTHER PUBLICATIONS

"At hair's breadth—Marked survey on wire saws", p. 30 to 34, May 2000 issue of "PHOTON International", in English.
"Bekaert Steelcord Catalogue", in English, public as of Jan. 2000 as evidenced by p. 2, pp. 34 and 35.
"Internationally agreed methods for testing steel tyre cords", published by BISFA ("the International Bureau for the Standardisation of Man-made Fibres"), in English, public as of 1995 as evidenced by the front page, pp. 59 to 61.

\* cited by examiner

MONOFILAMENT METAL SAW WIRE

TECHNICAL FIELD OF INVENTION

The present invention relates to a monofilament metal saw wire, in particular for use with a wire saw for sawing hard material such as blocks of silicon or quartz.

BRIEF DISCUSSION OF RELATED ART

Wire saws are well known for sawing through hard material, such as e.g. for cutting wafers off a silicon block. Such wire saws comprise a monofilament metal saw wire being placed against the silicon block and being continuously or reciprocally moved while being drawn through the silicon block. The monofilament metal saw wire is generally coated with an abrasive material for aiding the sawing process. The abrasive material is usually applied onto the saw wire shortly before the latter enters a sawing zone wherein the saw wire comes into contact with the silicon block. The efficiency of the sawing process depends on a number of parameters, such as e.g. the characteristics of the block of hard material to be sliced, the speed of the saw wire. An important factor is the ability of the saw wire to entrain abrasive material.

Smooth saw wires have often been used in the past. Such monofilament metal saw wires however have the disadvantage that their smooth outer surface does not favour entrainment of abrasive material. Furthermore, during sawing, the abrasive material is easily stripped off the saw wire, thereby compromising efficiency and quality of the sawing process.

There was therefore a need to improve entrainment of the abrasive material by the saw wire. International patent application WO 90/12670 describes a monofilament metal saw wire wherein the abrasive material is well entrained by the saw wire and is not easily stripped therefrom. This can be achieved by altering the outer surface of the saw wire. According to one embodiment of WO 90/12670, microcavities are arranged in the surface of the saw wire. According to another embodiment, the saw wire is produced with varying diameter by providing the outer surface of the saw wire with a plurality of circumferential grooves. Although these solutions provide for a better entrainment of the abrasive material, the modification of the outer surface of the saw wire is generally slow and cumbersome.

BRIEF SUMMARY OF THE INVENTION

The invention provides an improved monofilament metal saw wire for a wire saw. The invention further provides a method for manufacturing an improved monofilament metal saw wire for a wire saw. The invention also provides an improved wire saw. Still further, the invention provides a method for sawing hard material.

In order to overcome the abovementioned problems, the present invention proposes a monofilament metal saw wire for a wire saw, the saw wire being made of a metallic wire of a diameter d and being provided with a plurality of crimps. The crimps are arranged in at least two different planes, such that, when measured between measuring rods of a micrometer over a length comprising crimps in at least two different planes, a circumscribed enveloping diameter D of the crimped saw wire is between 1.05 and 1.50 times the diameter d. The monofilament metal saw wire according to the invention has improved abrasive material entrainment characteristics. Indeed, the crimps provide the saw wire with recesses wherein the abrasive material can sit. Furthermore, the monofilament metal saw wire according to the invention is easy to produce. A straight saw wire can e.g. be provided with crimps by passing it through a pair of crimping wheels, whereby the surface itself of the saw wire does not need to be altered. Due to the better entrainment of abrasive material, the speed of the sawing process can be increased. It has been found that, by using the saw wire according to the invention, the sawing speed can be doubled, which leads to a considerably higher efficiency of the process.

Furthermore, due to the better entrainment of abrasive material, the speed of the abrasive material with respect to the saw wire itself is reduced, which leads to reduced wear of the saw wire. The saw wire according to the invention hence has a longer life that conventional saw wires. Due to the fact that the crimps of the saw wire are arranged in at least two different planes, the saw wire remains rectilinear during the sawing process. This leads to a more stable sawing process and an improved surface quality of the sliced piece.

By maintaining the circumscribed enveloping diameter of the saw wire between 1.05 and 1.50 times the diameter of the saw wire itself, the saw wire is provided with recesses of sufficient size for receiving and entraining abrasive material, while at the same time maintaining the necessary elongation characteristics for a saw wire. The enveloping diameter should, in any radial direction, e.g. not exceed 1.50 times the diameter of the saw wire in order not to confer to the saw wire too important elongation characteristics, which would cause the saw wire to buckle during the sawing process.

It is further worth to be noted that the abrasive material on the saw wire is not easily stripped off the saw wire. It follows that the saw wire can be used to saw through considerably larger blocks of hard material. Use of the present saw wire easily allows for a cut length of up to 2 meters.

Advantageously, the crimps have a maximum wavelength of 10 mm and the micrometer comprises platelets at the ends of the measuring rods for measuring the enveloping diameter therebetween, the platelets having a diameter of at least 20 mm. By using such platelets, the enveloping diameter of the saw wire can be easily and accurately measured. Preferably, the maximum and minimum enveloping diameters of the saw wire is measured by rotating the saw wire between the platelets.

Preferably, the enveloping diameter of the crimped saw wire is between 1.10 and 1.30 times the diameter d. By reducing the maximum enveloping diameter, the thickness of the cut can be reduced and the elongation characteristics of the saw wire are reduced. By increasing the minimum enveloping diameter, the entrainment of abrasive material is increased. For a saw wire having a diameter of 0.25 mm, the circumscribed enveloping diameter would hence preferably be between 0.275 mm and 0.325 mm.

The diameter d of the saw wire can be between 0.15 and 0.50 mm, preferably between 0.20 and 0.30 mm. More preferably, the diameter d of the saw wire is about 0.25 mm. The diameter of the saw wires should however not be considered as limiting.

According to a first embodiment, the saw wire comprises a plurality of alternating first and second sections, wherein, in any of the first and second sections, the saw wire is crimped in at least a first and a second plane. The wavelength of the crimps in the first plane is preferably longer than the wavelength of the crimps in the second plane. The resulting saw wire has uniform crimping along the whole length of the saw wire.

According to a second embodiment, the saw wire comprises a plurality of alternating first and second sections, wherein, in the first section, the saw wire is essentially crimped in a first plane, and, in the second section, the saw wire is essentially crimped in a second plane. The resulting saw wire has alternating sections of crimps in different planes. The length of the first and second sections do preferably not exceed 10 mm, such that buckling of the saw wire cannot occur during the sawing process. Furthermore, the length of the first and second sections should be such that the platelets of the micrometer always cover at least one first and second section.

Preferably, the first plane is substantially perpendicular to the second plane. It should be noted that the saw wire can comprise crimps in more that two planes, in which case, the planes are preferably arranged accordingly, preferably such that the angles between neighbouring planes is at least roughly equal, thereby ensuring that the saw wire remains essentially rectilinear during the sawing process.

Although crimps of any form are possible, crimps having a zigzag form are preferred for their better stability.

The saw wire preferably comprises a coating of abrasive material, such as e.g. a slurry of abrasive powder.

The present invention also concerns a method for manufacturing the above monofilament metal saw wire.

According to a first embodiment, the method comprises the steps of providing a straight monofilament metal saw wire; crimping the saw wire in a first plane by passing it between a first pair of crimping wheels; and crimping the saw wire in a second plane by passing it between a second pair of crimping wheels. The crimping wheels of the first and second pairs of crimping wheels have their axes substantially parallel to each other. The crimping wheels of the first and second pairs of crimping wheels are designed such that the crimps in the first plane have a longer wavelength than the crimps in the second plane. The resulting saw wire comprises a plurality of alternating first and second sections, wherein, in any of the first and second sections, the saw wire is crimped in at least a first and a second plane. This provides for a particularly easy, fast and effective method for crimping the saw wire in two different planes.

According to a second embodiment, the method comprises the steps of providing a straight monofilament metal saw wire; crimping the saw wire by passing the saw wire between a first pair of crimping wheels while twisting it around its axis. The resulting saw wire comprises a plurality of alternating first and second sections, wherein, in the first section, the saw wire is essentially crimped in a first plane; and wherein, in the second section, the saw wire is essentially crimped in a second plane.

The present invention further concerns a wire saw for sawing hard material, such as blocks of silicon or quartz, wherein the wire saw comprises the above monofilament metal saw wire.

Furthermore, the present invention concerns a method for sawing a hard material, the method comprising the steps of drawing the above monofilament metal saw wire at high speed through the hard material, and adding an abrasive material, so that the abrasive material is entrained by the crimps in the saw wire.

Finally, the present invention concerns the use of the above monofilament metal saw wire for sawing hard material, such as blocks of silicon or quartz.

BRIEF DESCRIPTION OF THE DRAWINGS

The present invention will be more apparent from the following description of some not limiting embodiments with reference to the attached drawings, wherein.

DETAILED DESCRIPTION OF THE INVENTION

Figure 1:
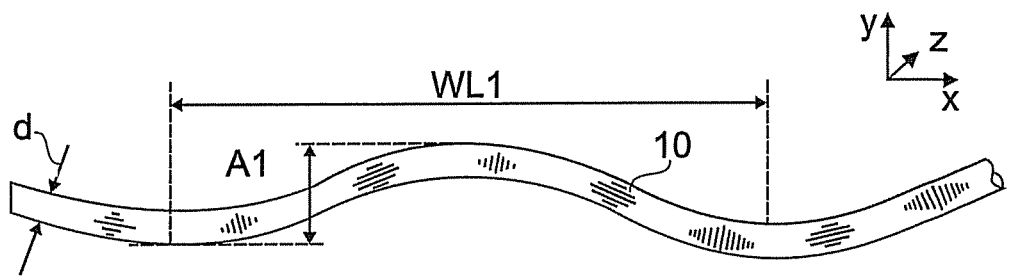
FIG. 1 is a side elevation view of a monofilament metal saw wire according to a first embodiment of the invention in the x-y plane.
Figure 2:
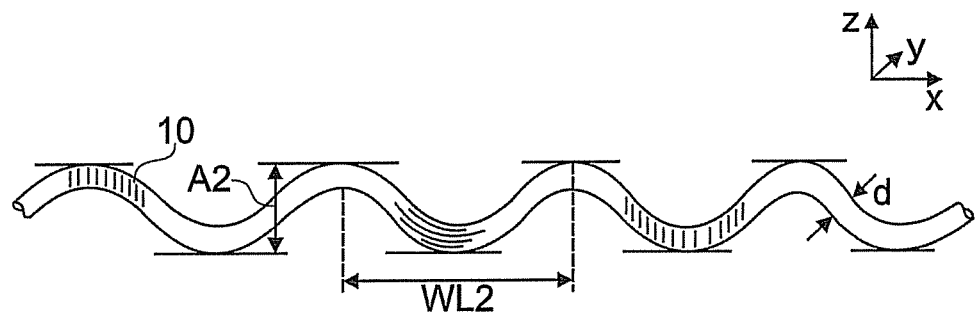
FIG. 2 is a side elevation view of the saw wire of FIG. 1 in the x-z plane.
Figure 3:
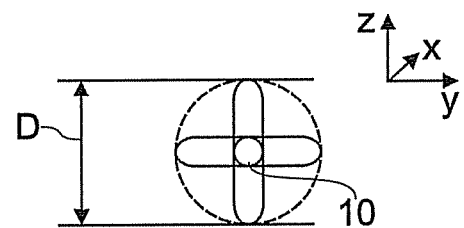
FIG. 3 is a cross-section view of the saw wire of FIG. 1 in the y-z plane.

A monofilament metal saw wire according to a first embodiment of the invention is shown in FIGS. 1 to 3. The saw wire is represented in FIG. 1 in the x-y plane, in FIG. 2 in the x-z plane, and in FIG. 3 in the y-z plane. The monofilament metal saw wire 10 is provided with a plurality of crimps 12 in two different planes. In the first plane, as shown in FIG. 1, the saw wire comprises crimps having a wavelength WL1 and an amplitude A1. In the second plane, as shown in FIG. 2, the saw wire comprises crimps having a wavelength WL2 and an amplitude A2. The wavelength WL2 is shorter than the wavelength WL1; for example, the wavelength WL1 can be about 5.0 mm while the wavelength WL2 can be about 3.3 mm. The monofilament metal saw wire 10 has itself a diameter d of 0.25 mm, which remains substantially constant over the whole length of the saw wire 10. The amplitudes A1,A2 are preferably between 1.10 and 1.30 times the diameter d of the saw wire 10. For a monofilament metal saw wire 10 having a diameter d of 0.25 mm, the amplitudes A1,A2 are then between 0.275-0.325 mm. The monofilament metal saw wire 10 with crimps according to the above characteristics has a circumscribed enveloping diameter D between 0.275-0.325 mm. FIG. 3, in which the monofilament metal saw wire 10 is shown in the y-z plane, clearly shows that the saw wire comprises crimps in two different planes. The dotted line shows a circumscribed enveloping perimeter of the monofilament metal saw wire 10.

Figure 4:
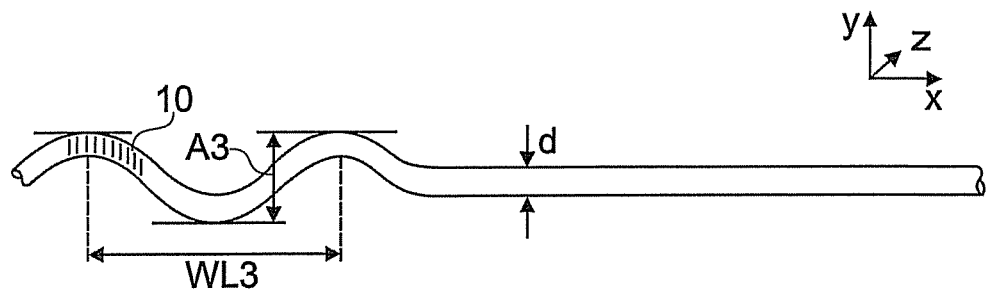
FIG. 4 is a side elevation view of a monofilament metal saw wire according to a second embodiment of the invention in the x-y plane.
Figure 5:
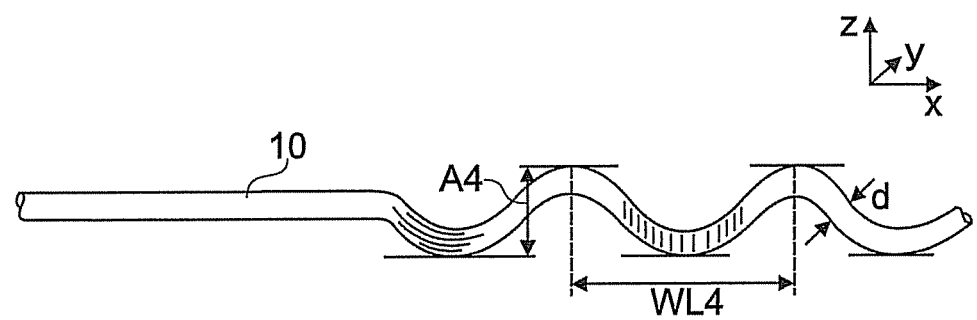
FIG. 5 is a side elevation view of the saw wire of FIG. 4 in the x-z plane.
Figure 6:
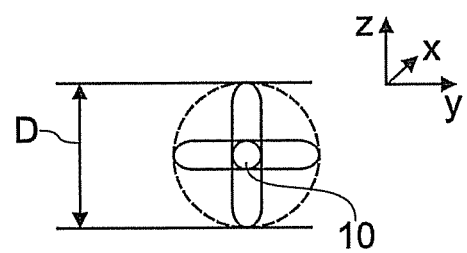
FIG. 6 is a cross-section view of the saw wire of FIG. 4 in the y-z plane.

A monofilament metal saw wire according to a second embodiment of the invention is shown in FIGS. 4 to 6. The saw wire is represented in FIG. 4 in the x-y plane, in FIG. 5 in the x-z plane, and in FIG. 6 in the y-z plane. The monofilament metal saw wire 10 is provided with a plurality of crimps 12 in two different planes. In the first plane, as shown in FIG. 4, the saw wire comprises crimps having a wavelength WL3 and an amplitude A3. In the second plane, as shown in FIG. 5, the saw wire comprises crimps having a wavelength WL4 and an amplitude A4. The monofilament metal saw wire 10 has itself a diameter d of 0.25 mm, which remains substantially constant over the whole length of the saw wire 10. The amplitudes A3,A4 are preferably between 1.10 and 1.30 times the diameter d of the saw wire 10. For a monofilament metal saw wire 10 having a diameter d of 0.25 mm, the amplitudes A3,A4 are then between 0.275-0.325 mm. The monofilament metal saw wire 10 with crimps according to the above characteristics has a circumscribed enveloping diameter D between 0.275-0.325 mm. FIG. 6, in which the monofilament metal saw wire 10 is shown in the y-z plane, clearly shows that the saw wire comprises crimps in two different planes. The dotted line shows a circumscribed enveloping perimeter of the monofilament metal saw wire 10.

Figure 7:
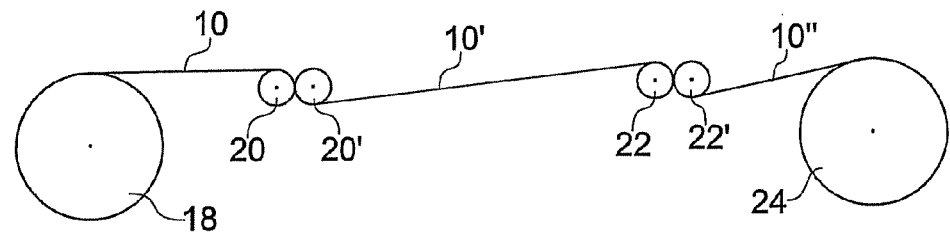
FIG. 7 is a schematic illustration of a method and apparatus for manufacturing the saw wire of FIG. 1

The present invention also concerns a method for manufacturing the monofilament metal saw wire according to the first embodiment. This method is schematically illustrated in FIG. 7, wherein a straight monofilament metal saw wire 10 is unwound from a reel 18 or directly received from a wire drawing machine and passed through a first pair of crimping wheels 20,20' for crimping the saw wire 10 in a first plane, thereby obtaining a saw wire 10' having crimps in one plane. The saw wire 10' is then passed through a second pair of crimping wheels 22,22' for crimping the saw wire 10' in a second plane, thereby obtaining a saw wire 10' having crimps in two planes. The second pair of crimping wheels 22,22' is arranged at some distance from the first pair of crimping wheels 20,20'. Indeed, it has been found that, when the saw wire 10' having crimps in one plane comes into contact with the first crimping wheel 22 of the second pair of crimping wheels 22,22', the saw wire 10' rotates by 90 degrees such that the first plane merges with the surface of the crimping wheel 22. As the saw wire 10' passes between the second pair of crimping wheels 22,22', the saw wire 10' is provided with crimps in a second plane, which is substantially perpendicular to the first plane. The saw wire 10' exiting the second pair of crimping wheels 22,22' hence has crimps in two different planes.

Advantageously, first and second pairs of crimping wheels 20,20'; 22,22' are designed such that the crimps in the first plane have a longer wavelength than the crimps in the second plane. This ensures that the crimps in the first plane are not removed while the crimps in the second plane are provided. In a particular example, the crimping wheels 20,20' of the first pair each have a diameter of 45 mm and comprise 28 crimping teeth, while the crimping wheels 22,22' of the second pair each have a diameter of 33 mm and comprise 31 crimping teeth. The first pair of crimping wheels 20,20' provide the saw wire with a crimps having a wavelength of about 5.0 mm in the first plane and the second pair of crimping wheels 22,22' provide the saw wire with a crimps having a wavelength of about 3.3 mm in the second plane. After the saw wire is crimped in the first and second planes, it can be wound onto a reel 24 for storage and transport.

It should be noted that this method, and indeed the apparatus for carrying out the method, is particularly easy. Two pairs of conventional crimping wheels can be mounted on a support and the saw wire can be pulled therethrough. The speed of the saw wire through the crimping wheel assembly can be up to 9 m/s.

Figure 8:
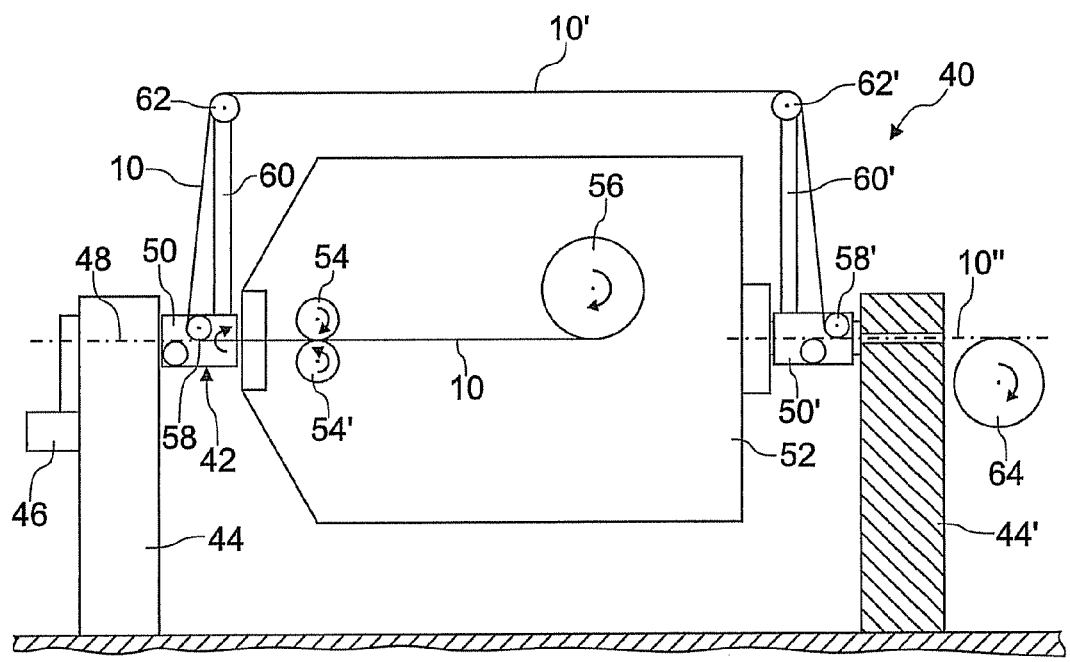
FIG. 8 is a schematic illustration of a method and apparatus for manufacturing the saw wire of FIG. 4

The present invention also concerns a method for manufacturing the monofilament metal saw wire according to the second embodiment. This method and an apparatus 40 for manufacturing this monofilament metal saw wire is schematically illustrated in FIG. 8, wherein a straight monofilament metal saw wire 10 is provided and passed through a pair of crimping wheels 54,54' while twisting it about its axis. As the saw wire 10 is twisted, it is provided with crimps in different planes.

The apparatus 40 comprises, in a configuration known per se, a rotor 42 that is supported by a support structure 44,44' in such a way as to be capable of being rotated by a motor 46 about a rotor rotation axis 48. The rotor comprises a first rotor end 50 and a second rotor end 50'. A cradle 52 is mounted between both rotor ends 50, 50', in such a way as to be capable of freely rocking about the rotor rotation axis 48, whereby the cradle 52 remains immobile in rotation when the rotor 42 is rotated about the rotor rotation axis 48.

The cradle 52 comprises a pair of crimping wheels 54,54' and a reel 56 for unwinding a straight monofilament metal saw wire 10 therefrom. The pair of crimping wheels 54,54' and the reel 56 are fixed on the cradle 52 and are consequently immobile in rotation about the rotor rotation axis 48. Straight monofilament metal saw wire 10 provided to the pair of crimping wheels 54,54'. The crimped saw wire 10' exiting the pair of crimping wheels 54,54' is twisted by the first rotor end 50, which is in rotation about the rotor rotation axis 48. The first rotor end 50 forms a first twisting device and comprises, in a configuration known per se, a deflection pulley 58 (which is also called twisting pulley 58), a flyer arm 60 and a flyer arm deflection pulley 62. The twisting pulley 58 is directly supported on the rotor 42. The flyer arm 60 extends radially from the first rotor end 50 and supports the flyer arm pulley 62 at its free end. The second rotor end 50' comprises, in the same way, a deflection pulley 58', a flyer arm 60' and a flyer arm deflection pulley 62'. The twisting pulley 58 guides the saw wire onto the flyer arm deflection pulley 62 of the flyer arm 60. From the flyer arm deflection pulley 62, the saw wire passes onto the flyer arm deflection pulley 62' of the flyer arm 60', whereby the saw wire is guided about the cradle 52 from the first rotor end 50 onto the second rotor end 50'. From the flyer arm deflection pulley 62', the saw wire passes into the second rotor end 50'. The deflection pulley 58' in this second rotor end 50' guides the saw wire within the axis of rotation 48 out of the second rotor end 50', where the saw wire is pulled away by a winding reel 64. Between the deflection pulley 58' and the winding reel 64, the saw wire is subjected to a second twist, which completes its formation.

Due to the twisting of the saw wire downstream of the crimping wheels 54,54', the saw wire is provided with crimps in more than one plane. Depending on the twisting speed and the speed of the saw wire through the crimping wheels 54,54', the saw wire is, in a first section thereof, crimped in a first plane. Due to the twisting, the saw wire suddenly rotates by about 90 degrees and is, in a second section thereof, crimped in a second plane. The saw wire then suddenly rotates again by about 90 degrees and is, in another first section thereof, again crimped in the first. The alternating first and second sections provide the saw wire with crimps in two essentially perpendicular planes.

Test Results:

Tests were carried out to evaluate the performance of the metal saw wire according to the invention.

A block of glass having a length of 700 mm has been sliced using a conventional saw wire without crimps in any planes and a saw wire according to the invention. The roughness of the sliced surface has then been measured. With a conventional saw wire, the roughness has been found to be between 8 and 9 µm in a border region of the block and between 6 and 7 µm in a central region of the block. With a saw wire according to the invention, on the other hand, the roughness has been found to be between 11 and 13 µm in a border region of the block and between 10 and 13 µm in a central region of the block.

Knowing that the roughness depends on the grain size of the grains in the abrasive material, one can deduce that in the case of the conventional saw wire, the grains of larger size only penetrate partially into the block of glass. By the time the saw wire reaches the central region of the glass block, the grains of larger size have been stripped off the saw wire and only grains of smaller size remain. In the case of the saw wire according to the invention, the above results show that the roughness is more or less the same in the border and central regions. This means entrainment of abrasive material is improved with respect to the conventional saw wire and that hardly any abrasive grains are stripped off the saw wire.

The speed of the conventional saw wire through the block of glass had to be limited to a maximum of 800 µm/min in order to avoid buckling. With the saw wire according to the invention, a speed of 1500 µm/min was easily obtained. Using the saw wire according to the invention can hence about double the cutting speed.

It should finally be noted that the dimensions in FIGS. 1 to 6 have been greatly exaggerated.

The invention claimed is:

1. A monofilament metal saw wire for use as a wire saw when coated with a slurry of abrasive material, the metal saw wire comprising:
   a substantially circular cross-sectional shape with a diameter d,
   a plurality of crimps having a zigzag form,
   wherein said crimps are arranged in at least a first plane and a second plane distinct from said first plane, said crimps in said first plane having a first wavelength and said crimps in said second plane having a second wavelength, said first wavelength being longer than said second wavelength and said first wavelength is not an integer multiple of said second wavelength,
   wherein said crimps in said first plane and said second plane provide recesses where the abrasive material of the slurry sits during entrainment, and
   wherein when measured, between measuring rods of a micrometer, over a length comprising crimps in said first plane and said second plane, a circumscribed enveloping diameter D of said crimped saw wire is between 1.05 and 1.50 times said diameter d.

2. The saw wire according to claim 1, wherein said crimps have a maximum wavelength of 10 mm and said micrometer comprises platelets at the ends of said measuring rods for measuring said enveloping diameter therebetween, said platelets having a diameter of at least 20 mm.

3. The saw wire according to claim 1, wherein said enveloping diameter of said crimped saw wire is between 1.10 and 1.30 times said diameter d.

4. The saw wire according to claim 1, wherein said diameter d of said saw wire is between 0.15 and 0.50 mm.

5. The saw wire according to claim 1, wherein said diameter d of said saw wire is between 0.20 and 0.30 mm.

6. The saw wire according to claim 1, wherein said saw wire comprises a plurality of alternating first and second sections,
   wherein, in any of said first and second sections, said saw wire is crimped in at least a first and a second plane.

7. The saw wire according to claim 6, wherein said first plane is substantially perpendicular to said second plane.

8. The saw wire according to claim 1, wherein said saw wire comprises a plurality of alternating first and second sections,
   wherein, in said first section, said saw wire is essentially crimped in a first plane; and
   wherein, in said second section, said saw wire is essentially crimped in a second plane.

9. The saw wire according to claim 8, wherein said first plane is substantially perpendicular to said second plane.

10. The saw wire according to claim 1, further comprising a coating of abrasive material.

11. A method for manufacturing a monofilament metal saw wire for use as a wire saw when coated with a slurry of abrasive material, said method comprising the steps of:
    providing a straight monofilament metal saw wire being metallic and including a substantially circular cross-sectional shape with a diameter d;
    crimping said saw wire to create crimps in a first plane by passing said saw wire between a first pair of crimping wheels having axes; and
    crimping said saw wire to create crimps in a second plane by passing said saw wire between a second pair of crimping wheels having axes, wherein said saw wire is rotated by 90 degrees when said saw wire with said crimps in said first plane comes into contact with a first crimping wheel of said second pair of crimping wheels, wherein a wavelength of said crimps in said first plane is not an integer multiple of a wavelength of said crimps in said second plane;
    creating recesses where the abrasive material of the slurry sits during entrainment via said crimping in said first plane and said crimping in said second plane,
    wherein said axes of said first pair of crimping wheels are substantially parallel to said axes of said second pair of crimping wheels;
    wherein said crimping wheels of said first and second pairs of crimping wheels are designed such that said crimps in said first plane have a longer wavelength than said crimps in said second plane; and
    wherein said crimps have a zig-zag form and are arranged such that, when measured between measuring rods of a micrometer, over a length comprising crimps in at least two different planes, a circumscribed enveloping diameter D of said crimped saw wire is between 1.05 and 1.50 times said diameter d.

12. A method for sawing a hard material using a monofilament wire saw coated with a slurry of abrasive material, said method comprising the steps of: drawing the monofilament metal saw wire at high speed through said hard material, said saw wire being metallic and including a substantially circular cross-sectional shape with a diameter d, said wire being provided with a plurality of crimps having a zigzag form, wherein said crimps are arranged in at least a first plane and a second plane and a wavelength of said crimps in said first plane is not an integer multiple of a wavelength of said crimps in said second plane, wherein said crimps provide recesses where the abrasive material of the slurry sits during entrainment, and when measured, between measuring rods of a micrometer, over a length comprising crimps in at least said first plane and said second plane, a circumscribed enveloping diameter D of said crimped saw wire is between 1.05 and 1.50 times said diameter d, adding an abrasive material, so that said abrasive material is entrained by said crimps in said saw wire.

13. A monofilament metal saw wire for use as a wire saw when coated with a slurry of abrasive material, the metal saw wire comprising:
    a substantially circular cross-sectional shape with a first diameter and a second diameter disposed substantially perpendicular to said first diameter, said first and said second diameter including a substantially equal length,
    wherein said wire is provided with a plurality of crimps having a zigzag form,
    wherein said crimps are arranged in at least a first plane and a second plane and a wavelength of said crimps in said first plane is not an integer multiple of a wavelength of said crimps in said second plane, wherein said crimps provide recesses where the abrasive material of the slurry sits during entrainment, and to create a circumscribed enveloping shape that includes a first enveloping diameter and a second enveloping diameter distinct from said first enveloping diameter, said first enveloping diameter being 1.05 and 1.50 times said substantially equal length of both of said first diameter and said second diameter, and second enveloping diameter being 1.05 and 1.50 times said substantially equal length of both of said first diameter and said second diameter.

14. A monofilament metal saw wire for use as a wire saw when coated with a slurry of abrasive material, the saw wire being metallic and comprising:
 a wire body with substantially circular cross-sectional shape with a diameter d,
 a plurality of crimps having a zigzag form disposed in said wire body, wherein said crimps are arranged in at least a first plane and a second plane and a wavelength of said crimps in said first plane is not an integer multiple of a wavelength of said crimps in said second plane, wherein said crimps to provide recesses where abrasive material of the slurry sits during entrainment, and when measured, between measuring rods of a micrometer, over a length comprising crimps in at least two different planes, a circumscribed enveloping shape of said wire body includes an enveloping diameter D between 1.05 and 1.50 times said diameter d,
 wherein said wire body with said crimps that are arranged in said at least two different planes is affixable to the wire saw.

15. A method for manufacturing a monofilament metal saw wire for use as a wire saw when coated with a slurry of abrasive material, said method comprising the steps of:
 providing a straight monofilament metal saw wire body being metallic and including a substantially circular cross-sectional shape with a diameter d;
 crimping said saw wire body to create crimps in a first plane by passing said saw wire body between a first pair of crimping wheels having axes;
 crimping said saw wire body to create crimps in a second plane by passing said saw wire body between a second pair of crimping wheels having axes, wherein said saw wire is rotated by 90 degrees when said saw wire with said crimps in said first plane comes into contact with a first crimping wheel of said second pair of crimping wheels;
 creating recesses where the abrasive material of the slurry sits during entrainment via said crimping in said first plane and said crimping in said second plane,
 wherein said axes of said first pair of crimping wheels are substantially parallel to said axes of said second pair of crimping wheels;
 wherein said crimping wheels of said first and second pairs of crimping wheels are designed such that said a wavelength of said crimps in said first plane is longer than a wavelength of said crimps in said second plane, and said wavelength of said crimps in the first plane is not an integer multiple of a wavelength of said crimps in said second plane;
 wherein said crimps are arranged such that, when measured between measuring rods of a micrometer, over a length comprising crimps in at least two different planes, a circumscribed enveloping diameter D of said crimped saw wire is between 1.05 and 1.50 times said diameter d; and
 affixing said saw wire body to a wire saw.

* * * * *